(12) United States Patent
Watanabe

(10) Patent No.: US 10,830,290 B2
(45) Date of Patent: Nov. 10, 2020

(54) ONE-WAY CLUTCH

(71) Applicant: JTEKT CORPORATION, Osaka (JP)

(72) Inventor: Hajime Watanabe, Kashiwara (JP)

(73) Assignee: JTEKT CORPORATION, Osaka (JP)

(*) Notice: Subject to any disclaimer, the term of this patent is extended or adjusted under 35 U.S.C. 154(b) by 34 days.

(21) Appl. No.: 16/277,245

(22) Filed: Feb. 15, 2019

(65) Prior Publication Data
US 2019/0257374 A1    Aug. 22, 2019

(30) Foreign Application Priority Data
Feb. 22, 2018 (JP) .................................. 2018-029263

(51) Int. Cl.
*F16D 41/07* (2006.01)
*F16D 41/06* (2006.01)

(52) U.S. Cl.
CPC ...... *F16D 41/07* (2013.01); *F16D 2041/0603* (2013.01); *F16D 2041/0605* (2013.01)

(58) Field of Classification Search
CPC ........... F16D 41/06; F16D 41/069–076; F16D 2041/0603; F16D 2041/0605
See application file for complete search history.

(56) References Cited

U.S. PATENT DOCUMENTS

| | | | | |
|---|---|---|---|---|
| 2,342,227 A | * | 2/1944 | Swenson ................. | F16C 33/54 192/45.1 |
| 4,792,028 A | * | 12/1988 | Nishimura .............. | F16D 41/07 192/41 A |
| 5,842,548 A | * | 12/1998 | Sato ........................ | F16D 41/07 192/45.1 |
| 6,837,352 B2 | * | 1/2005 | Ohishi .................. | F16D 41/069 192/41 A |
| 7,503,442 B2 | * | 3/2009 | Straub .................... | F16D 41/07 192/107 T |
| 2003/0051963 A1 | * | 3/2003 | Ohishi ................... | F16D 41/07 192/45.1 |

FOREIGN PATENT DOCUMENTS

| | | | | |
|---|---|---|---|---|
| JP | 06117461 A | * | 4/1994 | ............ F16D 41/07 |
| JP | H11-141576 A | | 5/1999 | |
| JP | 2016-186317 A | | 10/2016 | |

* cited by examiner

*Primary Examiner* — Ernesto A Suarez
*Assistant Examiner* — James J Taylor, II
(74) *Attorney, Agent, or Firm* — Oliff PLC

(57) ABSTRACT

A one-way clutch includes multiple sprags located between an outer ring member and an inner ring member, a cage that holds the sprags such that the sprags are circumferentially spaced from each other, and a spring disposed along the cage and in contact with the sprags. The cage includes a tubular body and an annular flange. The body has multiple pockets that hold the sprags. The flange extends from an axial end of the body toward the outer ring member. A clearance is formed between the outer ring member and the flange along their entire circumference.

6 Claims, 6 Drawing Sheets

ONE-WAY CLUTCH

INCORPORATION BY REFERENCE

The disclosure of Japanese Patent Application No. 2018-029263 filed Feb. 22, 2018 including the specification, drawings and abstract, is incorporated herein by reference in its entirety.

BACKGROUND OF THE INVENTION

1. Field of the Invention

The invention relates to a one-way clutch.

2. Description of Related Art

There are two types of one-way clutches: a sprag-type one-way clutch; and a cam-type one-way clutch. The cam-type one-way clutch has wedge-shaped spaces between an outer ring member and an inner ring member. Thus, it is necessary to form cam faces either on the inner circumferential surface of the outer ring member or on the outer circumferential surface of the inner ring member. On the other hand, as for the sprag-type one-way clutch, the inner circumferential surface of an outer ring member and the outer circumferential surface of an inner ring member are both cylindrical in shape. Therefore, the sprag-type one-way clutch may have an advantage in terms of manufacturing cost over the cam-type one-way clutch.

The sprag-type one-way clutch includes an annular cage and a spring. The cage holds multiple sprags such that the sprags are circumferentially spaced from each other. The spring is disposed along the cage. The spring is in contact with the sprags while being elastically deformed, thus maintaining the sprags in a predetermined posture. The inner ring member, the outer ring member, and the sprags may be made of steel, such as carbon steel. The spring may be made of, for example, spring steel.

When the inner ring member rotates in one direction relative to the outer ring member, the sprags are wedged between the outer ring member and the inner ring member, so that the outer ring member and the inner ring member rotate together as a unit. This state is hereinafter referred to as a "locked state". On the other hand, when the inner ring member rotates in the other direction relative to the outer ring member, the sprags are unwedged, so that the inner ring member idles relative to the outer ring member. This state is hereinafter referred to as a "free state".

In a one-way clutch disclosed in Japanese Patent Application Publication No. 2016-186317 (JP 2016-186317 A) or Japanese Patent Application Publication No. H11-141576 (JP 11-141576 A), a cage is fixed to an outer ring member. Specifically, the cage includes a tubular body and an annular flange. The body has multiple pockets that hold sprags. The flange extends from an axial end of the body toward the outer ring member. The outer circumferential edge of the flange is fitted to the inner circumferential surface of the outer ring member (by interference fit). Thus, the cage is fixed to the outer ring member.

The sprags are held in the pockets of the cage. A spring is disposed along the cage and is integrated with the cage. According to the related-art one-way clutch, since the cage is fixed to the outer ring member, the spring is fixed indirectly to the outer ring member. In contrast to the spring, the sprags are allowed to change their posture (i.e., position) within the pockets of the cage. The spring is in contact with the sprags while being elastically deformed. Thus, the sprags are maintained in a predetermined posture between the outer ring member and an inner ring member.

According to the related-art one-way clutch, when torque is applied between the outer ring member and the inner ring member in the locked state, the sprags are tilted while the inner ring member, the outer ring member, and the sprags are elastically deformed. At this time, the sprags press and deflect the spring. As described above, although the cage and the spring are fixed to the outer ring member, the sprags are allowed to change their posture (i.e., position) within the pockets. Therefore, when the posture (i.e., position) of the sprags is changed greatly due to excessive torque being applied between the outer ring member and the inner ring member, the deflection of the spring may exceed an allowable amount. Such large deflection may cause plastic deformation of the spring. If the plastic deformation occurs, the spring is not in proper contact with the sprags, even after the applied torque is removed, so that the sprags become unstable. This may degrade the functionality of the one-way clutch.

SUMMARY OF THE INVENTION

A purpose of the invention is to provide a one-way clutch having a structure for preventing a spring from being excessively pressed and deflected by sprags when excessive torque is applied.

An aspect of the invention provides a one-way clutch including the following: multiple sprags located between an outer ring member and an inner ring member; a cage that holds the sprags such that the sprags are circumferentially spaced from each other; and a spring disposed along the cage and in contact with the sprags. The cage includes a tubular body and an annular flange. The body has multiple pockets that hold the sprags. The flange extends from an axial end of the body toward the outer ring member. A clearance is formed between the outer ring member and the flange along entire circumference of the outer ring member and the flange.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
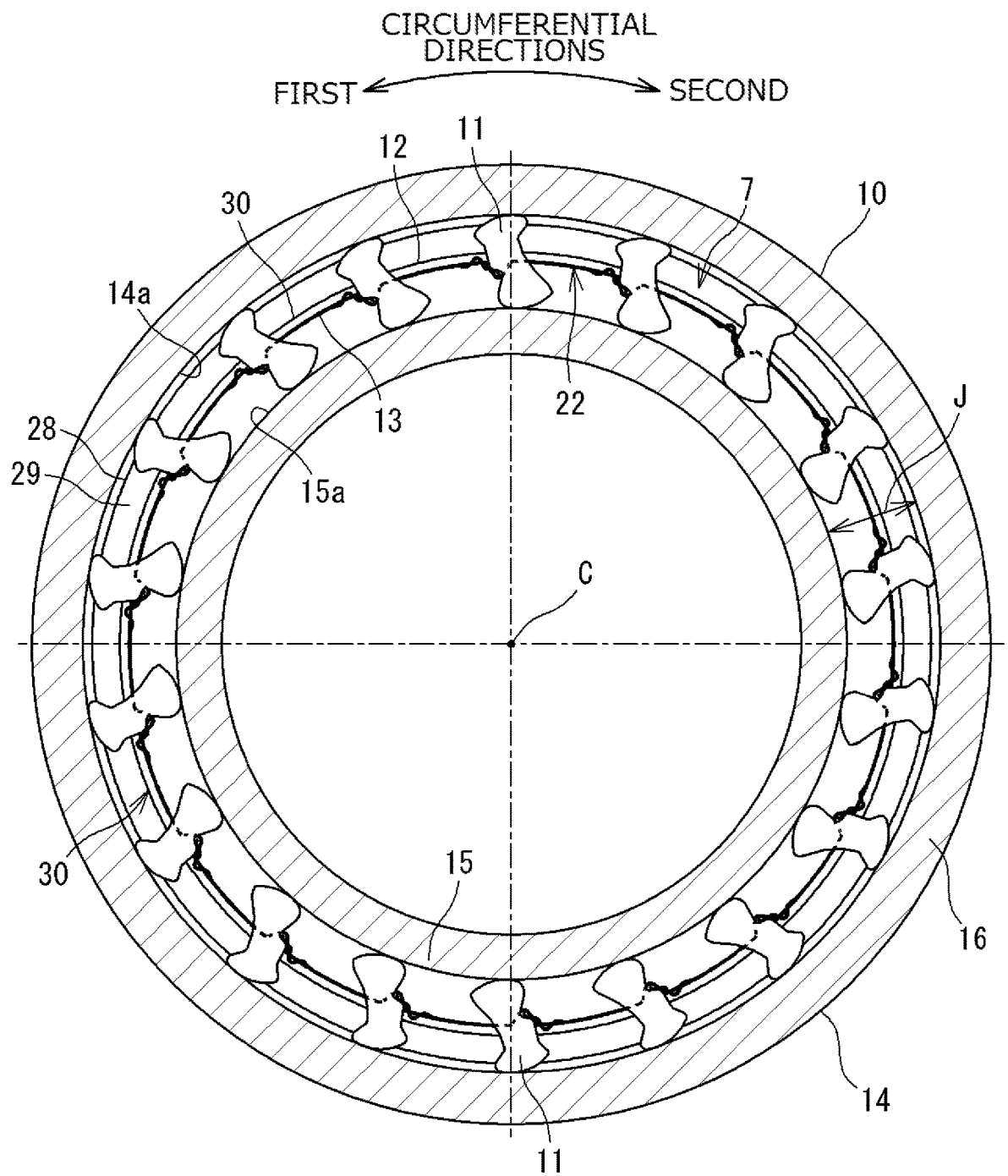
FIG. 1 is a side view of a one-way clutch according to an embodiment of the invention.
Figure 2:
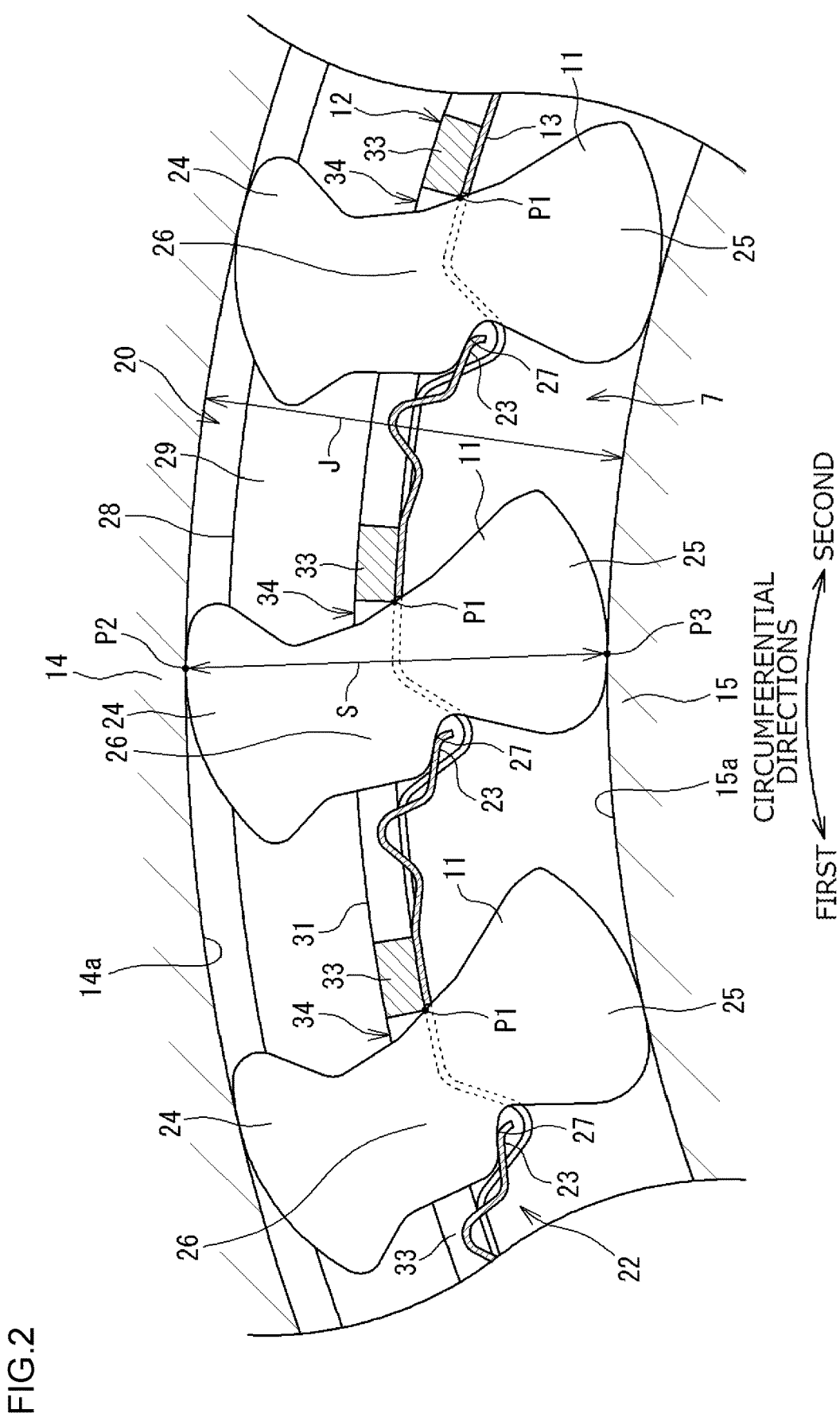
FIG. 2 is an enlarged partial view of the one-way clutch.
Figure 3:
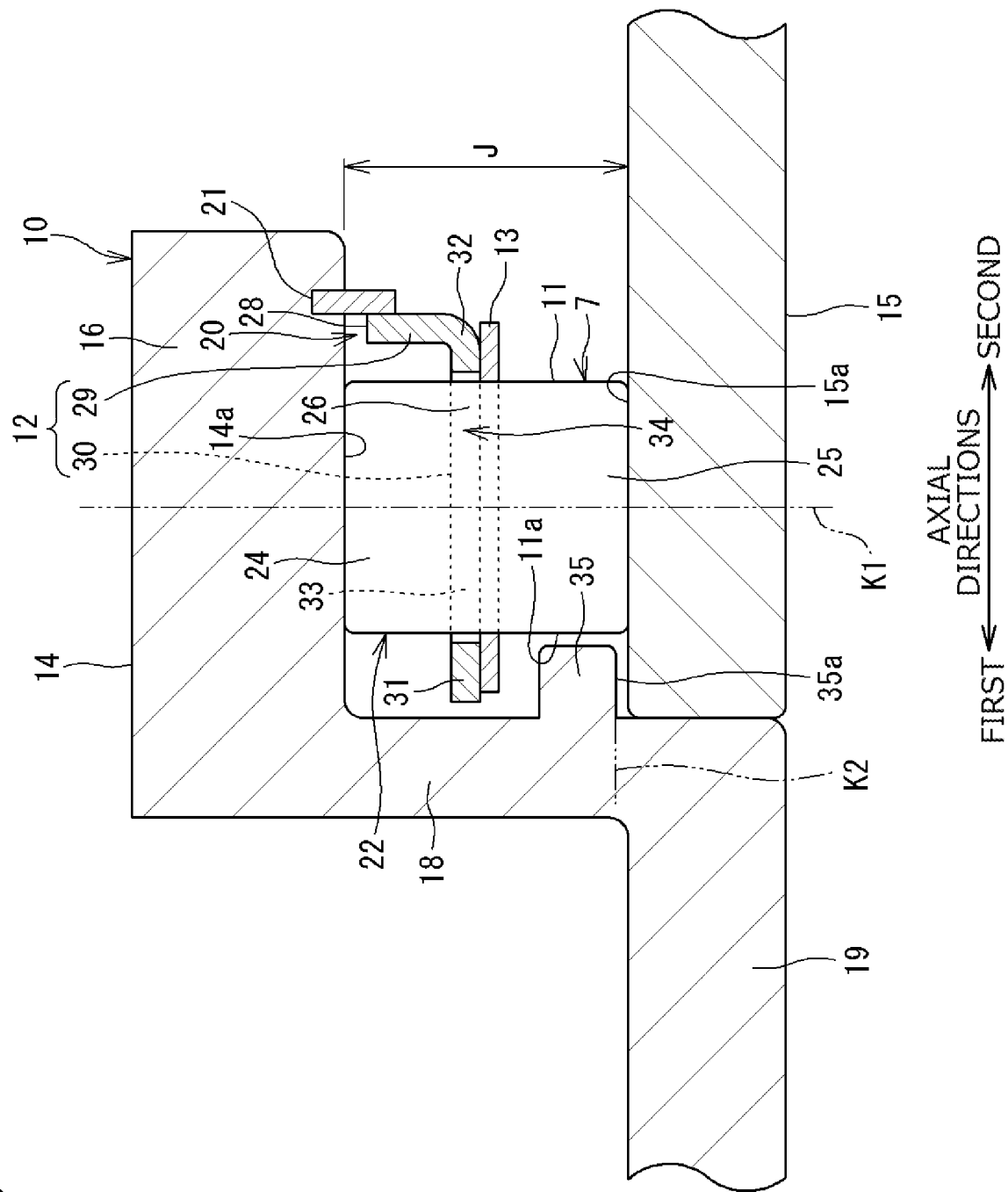
FIG. 3 is a cross-sectional view of the one-way clutch.

FIG. 1 is a side view of a one-way clutch 10 according to an embodiment. FIG. 2 is an enlarged partial view of the one-way clutch 10. FIG. 3 is a cross-sectional view of the one-way clutch 10. The one-way clutch 10 includes multiple sprags 11, an annular cage 12, and a spring 13. The one-way clutch 10 may be used in, for example, an automobile power transmission. Throughout the specification, the terms "axial" and "axially" refer to directions parallel to a central axis C of the one-way clutch 10, the terms "circumferential" and "circumferentially" refer to directions around the central axis C, and the terms "radial" and "radially" refer to directions perpendicular to the central axis C (i.e., directions along the radius of the one-way clutch 10).

The sprags 11 are located between an outer ring member 14 and an inner ring member 15. The outer ring member 14, the inner ring member 15, the cage 12, and the sprags 11 may be made of steel, such as carbon steel. The spring 13 may be made of, for example, spring steel. Each of the sprags 11 has the same shape. The outer ring member 14 and the inner ring member 15 are annular members. The outer ring member 14 is supported to a housing (not illustrated) by a bearing. The inner ring member 15 has a cylindrical shape and is integral with a rotating member (not illustrated). The rotating member is rotatably supported by a bearing unit (not illustrated). The outer ring member 14 and the inner ring member 15 are rotatable relative to each other. For the sake of brevity, the embodiment is described with reference to an example where the inner ring member 15 rotates relative to the outer ring member 14.

According to the embodiment, no rolling bearings are provided between the outer ring member 14 and the inner ring member 15. That is, the outer ring member 14 and the inner ring member 15 are each supported in a cantilevered manner. Thus, for example, a radial load being applied to the inner ring member 15 may cause "axis misalignment" where the central axis of the outer ring member 14 and the central axis of the inner ring member 15 are misaligned with each other. The axis misalignment is limited to a predetermined allowable amount by a misalignment limiting function that will be described later. In an aligned state where the axis misalignment does not occur, i.e., where the central axes of the outer ring member 14 and the inner ring member 15 are each aligned with the central axis C of the one-way clutch 10, a radial dimension J of an annular space 7 that is formed between an inner circumferential surface 14a of the outer ring member 14 and an outer circumferential surface 15a of the inner ring member 15 is circumferentially constant. The radial dimension J is half of the difference between the inside diameter of the outer ring member 14 and the outside diameter of the inner ring member 15. In a misaligned state where the axis misalignment occurs, i.e., where the central axes of the outer ring member 14 and the inner ring member 15 are misaligned with each other, the radial dimension J of the annular space 7 is smaller on a first circumferential position than on a second circumferential position that is 180 degrees away from the first circumferential position.

As illustrated in FIG. 3, the outer ring member 14 has a cylindrical portion 16 and an annular portion 18. The cylindrical portion 16 is cylindrical in shape. The cylindrical portion 16 has the inner circumferential surface 14a. The inner circumferential surface 14a is cylindrical about the central axis of the outer ring member 14. A radially outer portion 24 of each of the sprags 11 is in contact with the inner circumferential surface 14a. The annular portion 18 is annular in shape. The annular portion 18 extends radially inward from a first axial end of the cylindrical portion 16. The outer ring member 14 further includes a tubular portion 19. The tubular portion 19 extends in a first axial direction from an inner end of the annular portion 18 in the radial direction. At the tubular portion 19, the outer ring member 14 is supported to the housing (not illustrated).

A spacer 35 is provided between the annular portion 18 and the sprags 11. According to the embodiment, the spacer 35 is a unitary part of the outer ring member 14 (the annular portion 18). The spacer 35 protrudes from the annular portion 18 in a second axial direction opposite to the first axial direction. The spacer 35 is located radially outward from the outer circumferential surface 15a of the inner ring member 15. The spacer 35 is annular in shape and has a uniform circumferential cross-section. The spacer 35 is provided between the spring 13 and the inner ring member 15. The spacer 35 functions during assembly of the one-way clutch 10 as described in detail later. During the assembly, a side surface of the spacer 35 that faces in the second axial direction comes into contact with side surfaces 11a of the sprags 11. Thus, the spacer 35 limits tilting of the sprags 11 with respect to an imaginary plane K1 perpendicular to the central axis of the outer ring member 14. According to the embodiment, the spacer 35 has a circumferentially continuous closed annular shape. Alternatively, the spacer 35 may be divided into multiple portions that are circumferentially spaced from each other.

The spacer 35 has the misalignment limiting function. For this reason, the spacer 35 is integrated with the annular portion 18. Specifically, the spacer 35 is a unitary part of the outer ring member 14 (the annular portion 18). The spacer 35 is provided along an imaginary circle K2 about the central axis of the outer ring member 14. Specifically, a radially inner surface 35a of the spacer 35 is formed as a cylindrical surface along the imaginary circle K2. The misalignment limiting function of the spacer 35 is described in detail later.

According to the embodiment, the spacer 35 is part of the annular portion 18. Alternatively, the spacer 35 may be a separate piece from the annular portion 18 (the outer ring member 14). That is, the spacer 35 may be a separate ring member interposed between the annular portion 18 and the sprags 11. However, the spacer 35 needs to be integrated with the annular portion 18 in order to have the misalignment limiting function.

The cage 12 has a tubular body 30 and an annular flange 29. The body 30 has multiple pockets 34 formed therein. Each of the pockets 34 holds a corresponding one of the sprags 11. The body 30 has a first annular portion 31, a second annular portion 32, and multiple cage bars 33. The first annular portion 31 is located facing first axial sides of the sprags 11. The second annular portion 32 is located facing second axial sides of the sprags 11. The cage bars 33 joins the first annular portion 31 and the second annular portion 32 together. The first annular portion 31, the second annular portion 32, and circumferentially adjacent pairs of the cage bars 33 define therebetween the pockets 34 for holding the sprags 11 (refer to FIGS. 2 and 3). This structure allows the cage 12 to hold the sprags 11 such that the sprags 11 are circumferentially spaced from each other. As illustrated in FIG. 3, the flange 29 extends from an axial end of the body 30 (the second annular portion 32) toward the outer ring member 14.

Figure 4:
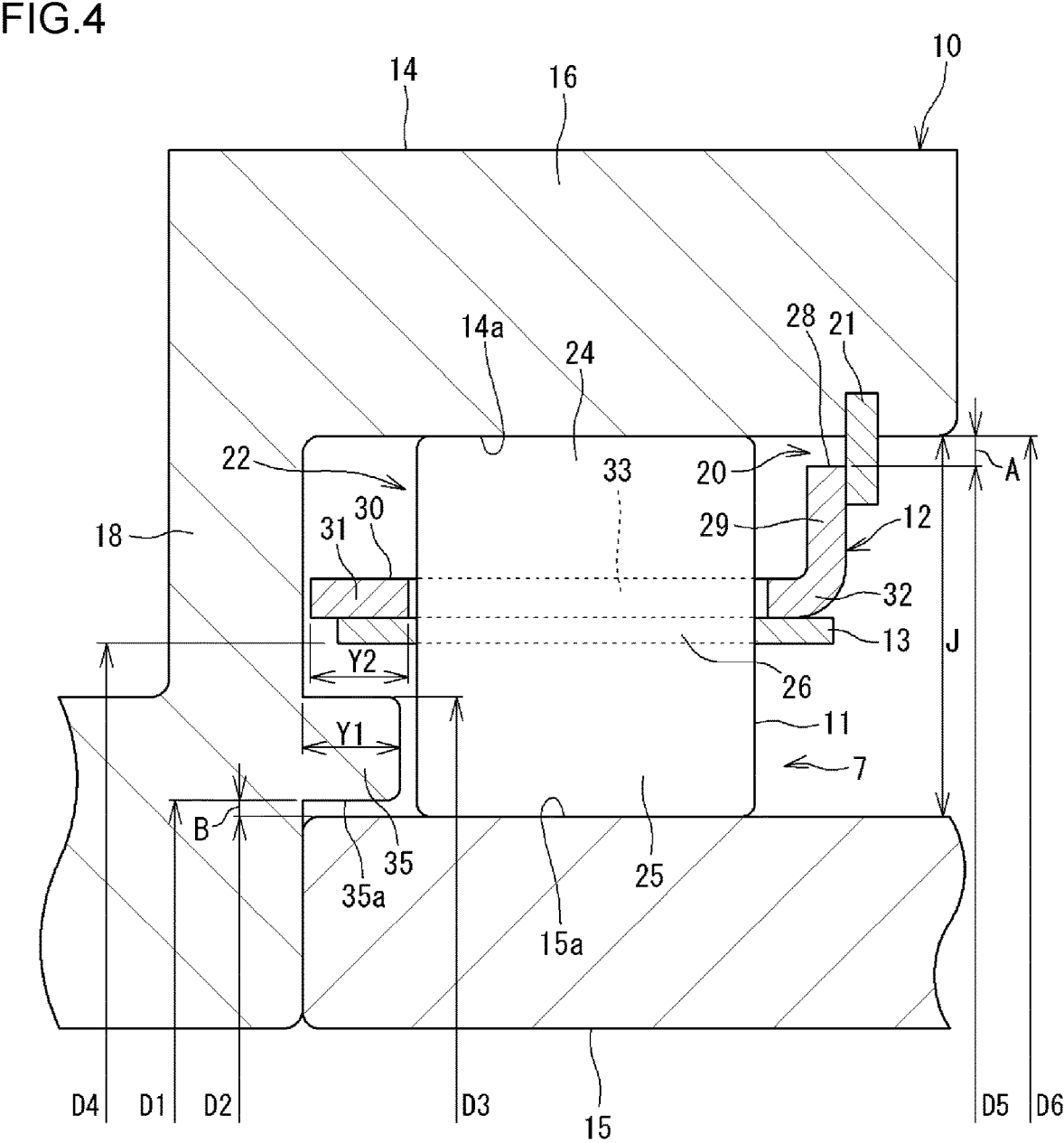
FIG. 4 is a detailed view of FIG. 3.

As illustrated in FIG. 1, an outer circumferential edge (an outer circumferential surface) 28 of the flange 29 forms a perfect circle. As illustrated in FIG. 4, an outside diameter D5 of the flange 29 (the diameter of the outer circumferential edge 28) is smaller than an inside diameter D6 of the outer ring member 14 (i.e., the diameter of the inner circumferential surface 14a). Since the outside diameter D5 is smaller than the inside diameter D6 (i.e., D5<D6), a radial clearance 20 is formed between the outer ring member 14 and the flange 29 along their entire circumference. In FIG. 4, a radial dimension of the clearance 20 is denoted by a letter "A".

A snap ring 21 is attached to the outer ring member 14. The snap ring 21 stops a sprag unit 22 from coming out of the annular space 7 in the second axial direction. The sprag unit 22 includes the cage 12, the sprags 11 held by the cage 12, and the spring 13 integrated with the cage 12.

The spring 13 has an annular shape and is disposed along an inner circumferential surface of the cage 12. The spring 13 is fitted to the inner circumference of the cage 12 so that the cage 12 and the spring 13 are integrated together as a one-piece member. The spring 13 may be a thin strip of metal formed into an annular shape. The spring 13 is in contact with the sprags 11. Specifically, as illustrated in FIG. 2, the spring 13 has tongue portions 23 that bias the sprags 11 by being in contact with the sprags 11.

As illustrated in FIG. 2, each of the sprags 11 includes the radially outer portion 24 (hereinafter referred to as the "outer portion 24"), a radially inner portion 25 (hereinafter referred to as the "inner portion 25"), and a radially middle portion 26 (hereinafter referred to as the "middle portion 26") between the outer portion 24 and the inner portion 25. Each of the sprags 11 has a stepped surface 27 on a first circumferential side between the middle portion 26 and the inner portion 25. The tongue portions 23 of the spring 13 are in contact with the stepped surfaces 27. As illustrated in FIG. 2, a second circumferential side of the middle portion 26 of each of the sprags 11 is in contact with a contact point P1 on a corresponding one of the cage bars 33 of the cage 12. The tongue portion 23 being elastically deformed presses the stepped surface 27 toward the outer ring member 14. The sprag 11 in the pocket 34 is held by being sandwiched between the tongue portion 23 and the contact point P1. The sprag 11 is swingable about the contact point P1.

As described above, the spring 13 has the tongue portions 23, each being in contact with part (the stepped surface 27) of the middle portion 26 of the corresponding sprag 11. The spring 13 is disposed along the inner circumference of the cage 12. Thus, the cage 12 and the spring 13 are integrated together as a one-piece member. When the axis misalignment between the outer ring member 14 and the inner ring member 15 occurs, the amount of tilt of the sprags 11 changes accordingly. This may cause the cage 12 and the spring 13 to be radially displaced.

According to the one-way clutch 10 having the structure described above, when the inner ring member 15 rotates in a counterclockwise direction (in a first circumferential direction in FIGS. 1 and 2) relative to the outer ring member 14, the sprags 11 are wedged between the outer ring member 14 and the inner ring member 15, so that the outer ring member 14 and the inner ring member 15 rotate together as a unit (i.e., relative rotation between the outer ring member 14 and the inner ring member 15 is not allowed). This state is hereinafter referred to as a "locked state". On the other hand, when the inner ring member 15 rotates in a clockwise direction (in a second circumferential direction in FIGS. 1 and 2) relative to the outer ring member 14, the sprags 11 are unwedged, so that the inner ring member 15 idles relative to the outer ring member 14 (i.e., relative rotation between the outer ring member 14 and the inner ring member 15 is allowed). This state is hereinafter referred to as a "free state".

In the locked state of the one-way clutch 10, excessive torque may be applied between the outer ring member 14 and the inner ring member 15. When the excessive torque is applied, the sprags 11 may be displaced greatly (as compared to when normal torque is applied). In this case, the clearance 20 that is formed between the outer ring member 14 and the flange 29 of the cage 12 along their entire circumference (refer to FIGS. 3 and 4) allows the cage 12 and the spring 13 to be circumferentially displaced so as to accommodate the displacement of the sprags 11. Thus, the clearance 20 serves to prevent the spring 13 (the tongue portions 23) from being excessively pressed and deflected by the sprags 11. Thus, the clearance 20 serves to prevent plastic deformation of the spring 13 (the tongue portions 23). This allows the spring 13 to come again into contact with proper portions (i.e., the stepped surfaces 27) of the sprags 11 after the applied excessive torque is removed. Thus, the sprags 11 are maintained in the predetermined posture by the spring 13 and are stably supported to the cage 12. This maintains the functionality of the one-way clutch 10.

Figure 5:
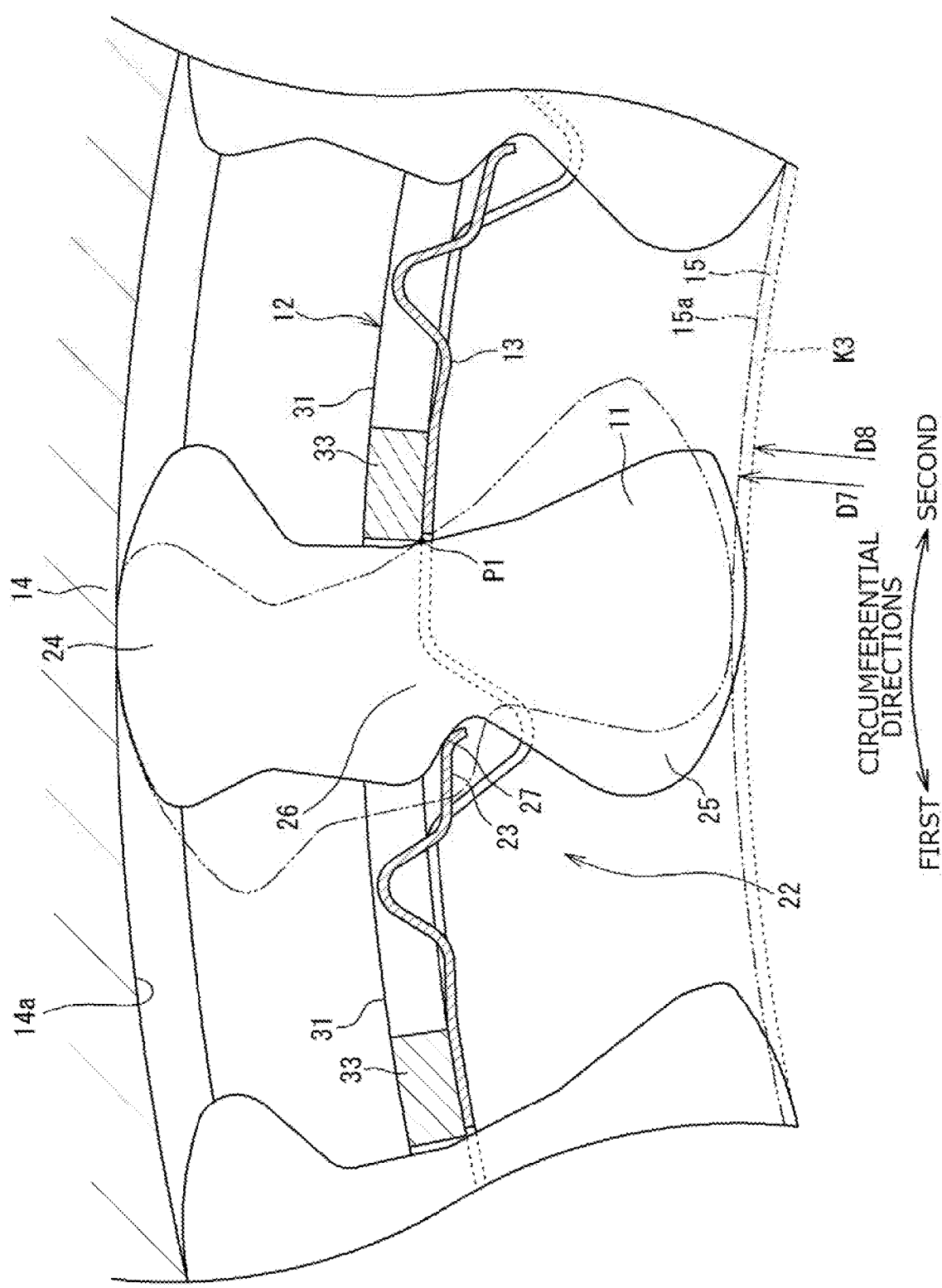
FIG. 5 is a diagram of a method for assembling the one-way clutch.

The one-way clutch 10 is assembled as follows. As illustrated in FIG. 5, the sprag unit 22 including the sprags 11, the cage 12, and the spring 13 is attached to the inner circumference of the outer ring member 14. Then, the inner ring member 15 is inserted radially inside the sprag unit 22.

As already described, the tongue portions 23 of the spring 13 elastically bias the stepped surfaces 27 of the sprags 11 toward the outer ring member 14. Therefore, before the assembly is started, each of the sprags 11 is displaced by swinging clockwise about the contact point P1. In FIG. 5, each of the swung sprags 11 before the assembly is started is represented by a continuous line, and a minimum inscribed circle K3 of the swung sprags 11 is represented by a dashed line. In FIG. 5, each of the sprags 11 and the inner ring member 15 (the outer circumferential surface 15a) after the assembly is completed is represented by a long dashed double-short dashed line (as a hidden outline). As represented by the continuous line in FIG. 5, before the assembly is started, the sprags 11 are displaced. As a result, a diameter D8 of the minimum inscribed circle K3 of the sprag unit 22 (the sprags 11) becomes smaller than an outside diameter D7 of the inner ring member 15, defined by the outer circumferential surface 15a (i.e., D8<D7). Thus, some way is needed to insert the inner ring member 15 radially inside the sprag unit 22.

Figure 6:
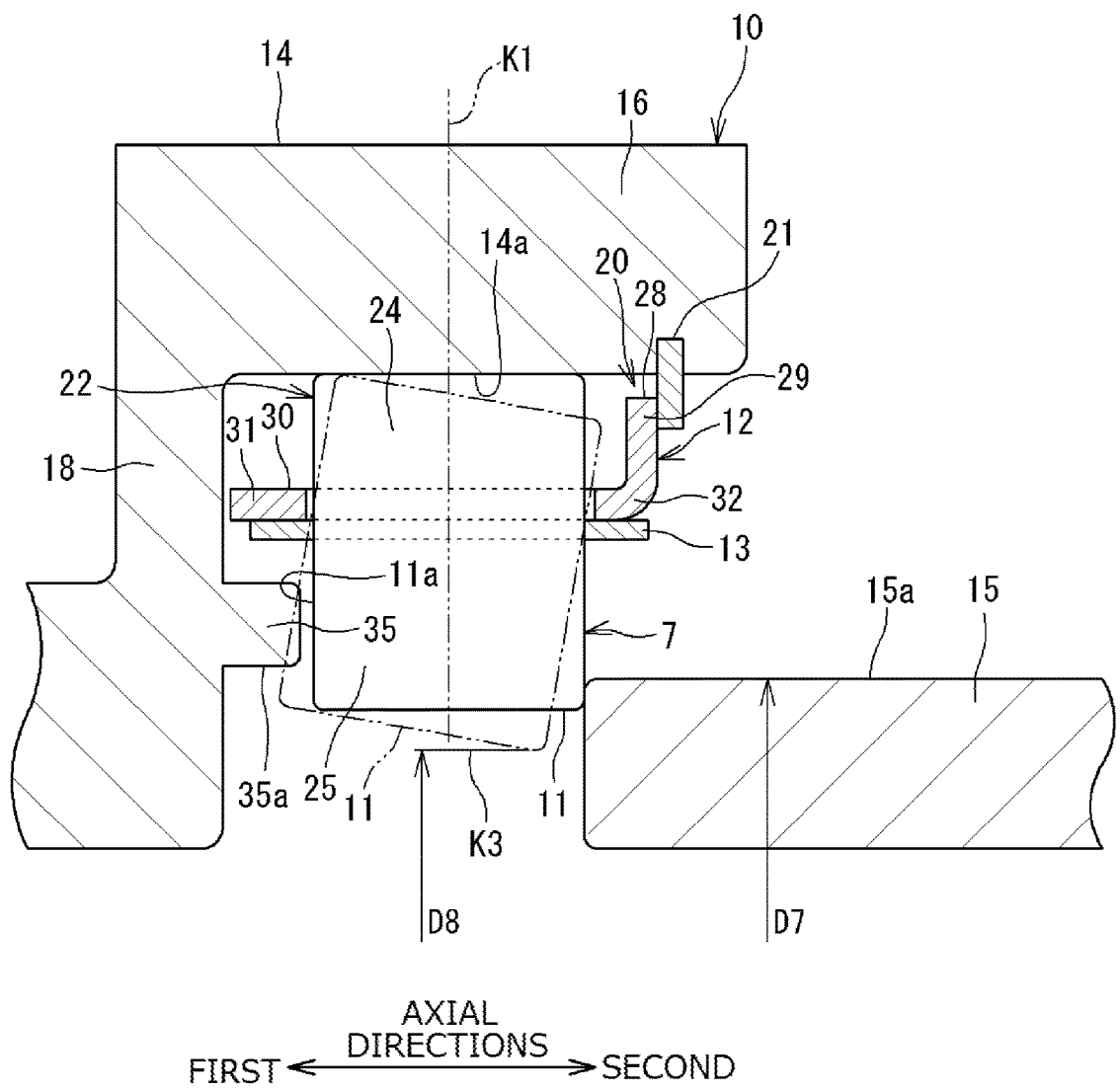
FIG. 6 is a cross-sectional view of the method for assembling the one-way clutch.

Specifically, as illustrated in FIG. 6, the inner ring member 15 is pressed, from the second axial side, against the inner portions 25 of the sprags 11 of the sprag unit 22 attached to the inner circumference of the outer ring member 14. Then, the inner ring member 15 being pressed against the inner portions 25 is rotated in a direction that brings the one-way clutch 10 into the free state (i.e., in the second circumferential direction in FIG. 5). This operation causes the sprags 11 to swing counterclockwise about the contact point P1 against the biasing force of the spring 13 (so that the sprags 11 approach their predetermined positions after the assembly is completed). Since the minimum inscribed circle K3 is expanded accordingly, it may be possible to fit the inner ring member 15 radially inside the sprag unit 22.

However, when the inner ring member 15 is axially pressed against the inner portions 25 of the sprags 11, the sprags 11 are likely to be tilted axially with respect to the imaginary plane K1 perpendicular to the central axis of the outer ring member 14, as illustrated in FIG. 6 by a long dashed double-short dashed line. This makes the diameter D8 of the minimum inscribed circle K3 of the sprag unit 22 much smaller, thus making it difficult to insert the inner ring member 15.

In this regard, according to the embodiment, the spacer 35 is provided between the annular portion 18 and the sprags 11. By coming into contact with the side surfaces 11a of the sprags 11, the spacer 35 limits tilting of the sprags 11 with respect to the imaginary plane K1. As described above, the inner ring member 15 is pressed, from the second axial side, against the inner portions 25 of the sprags 11 of the sprag unit 22 attached to the inner circumference of the outer ring member 14. Then, the inner ring member 15 being pressed against the inner portions 25 is rotated in the direction that brings the one-way clutch 10 into the free state (i.e., in the second circumferential direction in FIG. 5). This operation inserts the inner ring member 15 to attach the inner ring member 15. Since the spacer 35 limits tilting of the sprags 11, the insertion of the inner ring member 15 is facilitated.

The spacer 35 is described in more detail. As an axial length Y1 of the spacer 35 (in a direction parallel to the central axis of the outer ring member 14) illustrated in FIG. 4 is larger, the sprags 11 are more likely to come into contact with the spacer 35 during use of the one-way clutch 10. If the sprags 11 come into contact with the spacer 35, it becomes hard for the sprags 11 to change their posture (i.e., position). For this reason, the axial length Y1 of the spacer 35 and an axial length Y2 of the first annular portion 31 of the body 30 of the cage 12 satisfy an inequality (1):

$$Y2 - 0.05 \times J \leq Y1 < Y2 \quad (1),$$

where J represents the radial dimension of the annular space 7 that is formed between the outer ring member 14 and the inner ring member 15 in the aligned state.

This structure allows the spacer 35 to come into contact with the sprags 11 that are about to be tilted during assembly of the one-way clutch 10, thus facilitating the assembly. Further, according to this structure, when the sprag unit 22 is displaced in the first axial direction during use of the assembled one-way clutch 10, the first annular portion 31 of the cage 12 comes into contact with the annular portion 18 before the sprags 11 come into contact with the spacer 35. Thus, this structure serves to prevent the sprags 11 from coming into contact with the spacer 35 during use of the one-way clutch 10. That is, the spacer 35 does not interfere with operation of the sprags 11 during use of the one-way clutch 10. It is noted that if the axial length Y1 of the spacer 35 is too small, the spacer 35 does not effectively limit the tilting of the sprags 11. The condition "$Y2 - 0.05 \times J \leq Y1$" in the inequality (1) ensures that the spacer 35 effectively limit the tilting of the sprags 11.

Next, the function of limiting the axis misalignment between the central axes of the outer ring member 14 and the inner ring member 15 is described with reference to FIG. 4. The misalignment limiting function is provided by the spacer 35. The spacer 35 is integrated with the annular portion 18 of the outer ring member 14. The spacer 35 and the annular portion 18 are concentrically arranged relative to each other. A diameter D1 of an inscribed circle of the spacer 35 (according to the embodiment, the diameter D1 is equal to the inside diameter of the spacer 35 because of its annular shape) and a diameter D2 of the outer circumferential surface 15a of the inner ring member 15 satisfy an inequality (2):

$$D2 < D1 \leq D2 + 0.02 \times J \quad (2),$$

where J represents the radial dimension of the annular space 7 that is formed between the outer ring member 14 and the inner ring member 15 in the aligned state.

According to this structure, when the axis misalignment is about to occur, the outer circumferential surface 15a of the inner ring member 15 comes into partial contact with the radially inner surface 35a (i.e., the inner circumferential surface) of the spacer 35. Thus, this structure limits the axis misalignment. A radial dimension B of a radial clearance formed between the inner ring member 15 and the spacer 35 defines an allowable amount for the axis misalignment. That is, the axis misalignment may occur up to the allowable amount (i.e., the radial dimension B). When the diameter D1 of the inscribed circle of the spacer 35 is equal to the diameter D2 of the outer circumferential surface 15a of the inner ring member 15, i.e., when the radial dimension B is zero, the spacer 35 is in sliding contact with the inner ring member 15, thus causing undesirable rotational resistance.

For this reason, a diameter D3 of a circumscribed circle of the spacer 35 is set smaller than an inside diameter D4 of a portion of the spring 13 on the first axial side (i.e., D3<D4) so that the spacer 35 does not interfere with the spring 13.

The clearance 20 (refer to FIG. 4) is affected by the radial dimension B of the radial clearance between the inner ring member 15 and the spacer 35, which defines the allowable amount for the axis misalignment. As already described, the clearance 20 serves to prevent the spring 13 (the tongue portions 23, refer to FIG. 2) from being excessively pressed and deflected by the sprags 11 when excessive torque is applied in the locked state of the one-way clutch 10. For this purpose, the clearance 20 is provided between the outer ring member 14 and the flange 29 of the cage 12. That is, when the axis misalignment occurs in accordance with the radial dimension B of the radial clearance between the inner ring member 15 and the spacer 35, the sprag 11 is tilted about a fulcrum that is the contact point P1 (refer to FIG. 2) with the cage 12. The amount of tilt after the axis misalignment occurs may differ from the amount of tilt before the axis misalignment occurs. The cage 12 and the spring 13 are radially displaced in accordance with the amount of tilt. When a large amount of the axis misalignment occurs as a result of setting a large allowable amount for the axis misalignment, the cage 12 and the spring 13 may be radially displaced greatly.

It is preferable to maintain the clearance 20 even when the cage 12 and the spring 13 are radially displaced. To maintain the clearance 20, according to the embodiment, the radial dimension A of the clearance 20 and the radial dimension B of the radial clearance formed between the inner ring member 15 and the spacer 35 (refer to FIG. 4) satisfies an inequality (3):

$$A > B \quad (3)$$

The satisfaction of the inequality (3) ensures that the axis misalignment between the outer ring member 14 and the inner ring member 15 is limited to the allowable amount (i.e., the radial dimension B). Thus, even when the cage 12 and the spring 13 are radially displaced as a result of the axis misalignment, the clearance 20 is maintained to some extent between the outer ring member 14 and the flange 29 along their entire circumstance. Therefore, even when the axis misalignment not exceeding the allowable amount (i.e., the radial dimension B) occurs with excessive torque being applied in the locked state of the one-way clutch 10, the clearance 20 serves to prevent the spring 13 (the tongue portions 23, refer to FIG. 2) from being excessively pressed and deflected by the sprags 11.

In some cases, the axis misalignment may be still unresolved immediately after the one-way clutch 10 changes to the free state from the locked state. However, the satisfaction of the inequality (3) suppresses an increase in drag torque that is generated between the outer ring member 14 and the inner ring member 15. If the inequality (3) is not satisfied (i.e., when A≤B), the following situation may occur. When the axis misalignment reaches the allowable amount, the clearance 20 becomes zero at a position somewhere on the circumference. At that position, the cage 12 comes into contact with the outer ring member 14 and thus is not allowed to be displaced radially outward. In this condition, if the inner ring member 15 is further displaced toward the outer ring member 14 (the axis misalignment exceeds the allowable amount), the inner portion 25 (refer to FIG. 2) of the sprag 11 may be sandwiched between the inner ring member 15 and the cage 12 at the contact point P1. This may undesirably increase drag torque in the free state. In this regard, according to the embodiment, the increase in drag torque is suppressed by the satisfaction of the inequality (3).

Referring to FIG. 4, as the clearance 20 is larger, the cage 12 and the spring 13 are radially displaceable over a wider area. When the cage 12 and the spring 13 are radially displaced significantly, the posture of the sprags 11 becomes unstable. As a result, the sprags 11 may fail to be fully wedged between the outer ring member 14 and the inner ring member 15. To restrict the area over which the cage 12 and the spring 13 are radially displaceable, the radial dimension A of the clearance 20 is set to satisfy an inequality (4):

$$A<(S-J) \tag{4}$$

In the inequality (4), "S" represents a maximum radial dimension of each of the sprags 11 in the locked state. As illustrated in FIG. 2, the maximum radial dimension S is the length of a line between a contact point P2 (an outer contact point P2) and a contact point P3 (an inner contact point P3) when the one-way clutch 10 is in the locked state. The contact point P2 is where the outer portion 24 of the sprag 11 comes into contact with the outer ring member 14. The contact point P3 is where the inner portion 25 of the sprag 11 comes into contact with the inner ring member 15. In the inequality (4), "J" represents the radial dimension of the annular space 7 that is formed between the outer ring member 14 and the inner ring member 15 in the aligned state.

When the maximum radial dimension S becomes equal to the radial dimension J of the annular space 7 (i.e., S=J), the sprag 11 rolls over (topples over). Thus, whether or not the rollover occurs depends on a difference (S−J) between the maximum radial dimension S and the radial dimension J of the annular space 7. The rollover is preventable by setting the radial dimension B of the radial clearance between the inner ring member 15 and the spacer 35 to satisfy the following inequality: B<(S−J). Preferably, the radial dimension B be set to satisfy an inequality (5):

$$B \leq (S-J) \times 0.4 \tag{5}$$

According to the inequality (5), the radial dimension B that defines the allowable amount for the axis misalignment is limited to 40% of the difference (S−J). This effectively prevents the occurrence of the rollover. When at least one of the sprags 11 rolls over, the one-way clutch 10 may fail to generate predetermined desired transmission torque. The satisfaction of the inequality (5) effectively prevents the occurrence of the rollover. It is noted that when the axis misalignment between the outer ring member 14 and the inner ring member 15 occurs, the rollover of the sprags 11 is likely to occur. In this regard, according to the embodiment, the spacer 35 limits the axis misalignment.

In the case of the one-way clutch 10 according to the embodiment, the right side "(S−J)×0.4" of the inequality (5) is nearly equal to "0.02 J". Therefore, the inequality (5) is expressible as follows:

$$B<0.02J \tag{6}$$

As already described (refer to FIG. 1), in the one-way clutch 10 according to the embodiment, no rolling bearings are provided between the outer ring member 14 and the inner ring member 15. Thus, the outer ring member 14 and the inner ring member 15 are each supported in a cantilevered manner. This makes it likely that the axis misalignment between the outer ring member 14 and the inner ring member 15 occurs. However, according to the embodiment, the one-way clutch 10 has the misalignment limiting function that limits the axis misalignment.

It is to be understood that the embodiment is illustrative in all respects, rather than restrictive. The scope of the invention is defined by the claims, not the description of the embodiment, and includes all changes that fall within the scope of the claims and the equivalents thereof. Although the embodiment illustrates that no rolling bearings are provided between the outer ring member 14 and the inner ring member 15, rolling bearings may be provided therebetween.

According to the embodiment, the one-way clutch 10 has the clearance 20 that is formed between the outer ring member 14 and the flange 29 of the cage 12 along their entire circumference. As a reference example, a one-way clutch 10 that has the spacer 35, but does not have the clearance 20, is described below.

The one-way clutch 10 (refer to FIG. 3) according to the reference example includes multiple sprags 11, a cage 12, a spring 13. The sprags 11 are located between an outer ring member 14 and an inner ring member 15. The cage 12 holds the sprags 11 such that the sprags 11 are circumferentially spaced from each other. The spring 13 is disposed along the cage 12 and is in contact with the sprags 11. The outer ring member 14 has a cylindrical portion 16 and an annular portion 18. The cylindrical portion 16 is in contact with the sprags 11. The annular portion 18 extends radially inward from a first axial end of the cylindrical portion 16. A spacer 35 is provided between the annular portion 18 and the sprags 11. By coming into contact with side surfaces 11a of the sprags 11, the spacer 35 limits tilting of the sprags 11 with respect to the imaginary plane K1 perpendicular to the central axis of the outer ring member 14.

One concern with the reference example is as follows. Like in the embodiment, when the inner ring member 15 is axially pressed against inner portions 25 of the sprags 11 during assembly of the one-way clutch 10 (refer to FIG. 6), the sprags 11 are tilted with respect to the imaginary plane K1 perpendicular to the central axis of the outer ring member 14. This makes a minimum inscribed circle K3 of a sprag unit 22 much smaller, thus making it difficult to insert the inner ring member 15 radially inside the sprag unit 22. In this regard, according to the reference example, the spacer 35 limits tilting of the sprags 11 by coming into contact with the side surfaces 11a of the sprags 11. This facilitates the insertion of the inner ring member 15 radially inside the sprag unit 22. Other features described in the embodiment may be employed in the one-way clutch 10 according to the reference example so as to provide the one-way clutch 10 with the misalignment reduction function.

A one-way clutch according to the invention has a structure for preventing a spring from being excessively pressed and deflected by sprags when excessive torque is applied.

What is claimed is:
1. A one-way clutch comprising:
   a plurality of sprags located between an outer ring member and an inner ring member;
   a cage that holds the sprags such that the sprags are circumferentially spaced from each other; and
   a spring disposed along the cage and in contact with the sprags, wherein
   the cage includes a tubular body and an annular flange, the body has a plurality of pockets that hold the sprags, the flange extends from an axial end of the body toward the outer ring member, and a clearance is formed between the outer ring member and the flange and along an entire circumference of the outer ring member and the flange, wherein the outer ring member includes a cylindrical portion in contact with a radially outer portion of each of the sprags, and an annular portion extending radially inward from a first axial end of the cylindrical portion, a spacer is provided between the cylindrical portion and the sprags, the spacer is configured to come into contact with a side surface of each of the sprags so as to limit tilting of the sprags with respect to an imaginary plane perpendicular to a central axis of the outer ring member, the spacer is materially integrated with the annular portion and is provided along an imaginary circle about the central axis, and an inequality represented by $B>0$ is satisfied, where $B$ represents a radial dimension of a radial gap between the inner ring member and the spacer.

2. The one-way clutch according to claim 1, wherein an inequality represented by $A>B$ is satisfied, where $A$ represents a radial dimension of the clearance.

3. The one-way clutch according to claim 1, wherein an inequality represented by $A<(S-J)$ is satisfied, where $A$ represents a radial dimension of the clearance, $S$ represents a maximum radial dimension of each of the sprags when the one-way clutch is in a locked state, and $J$ represents a radial dimension of an annular space formed between the outer ring member and the inner ring member.

4. The one-way clutch according to claim 1, wherein an inequality represented by $B \leq (S-J) \times 0.4$ is satisfied, where $S$ represents a maximum radial dimension of each of the sprags when the one-way clutch is in a locked state, and $J$ represents a radial dimension of an annular space formed between the outer ring member and the inner ring member.

5. A one-way clutch comprising:

a plurality of sprags located between an outer ring member and an inner ring member;

a cage that holds the sprags such that the sprags are circumferentially spaced from each other; and a spring disposed along the cage and in contact with the sprags, wherein the cage includes a tubular body and an annular flange, the body has a plurality of pockets that hold the sprags, the flange extends from an axial end of the body toward the outer ring member, and a clearance is formed between the outer ring member and the flange and along an entire circumference of the outer ring member and the flange wherein the outer ring member includes a cylindrical portion in contact with a radially outer portion of each of the sprags, and an annular portion extending radially inward from a first axial end of the cylindrical portion, a spacer is provided between the cylindrical portion and the sprags, the spacer is configured to come into contact with a side surface of each of the sprags so as to limit tilting of the sprags with respect to an imaginary plane perpendicular to a central axis of the outer ring member, the body includes a first annular portion located facing a first axial side of the sprags, a second annular portion located facing a second axial side of the sprags, and a plurality of cage bars that join the first annular portion and the second annular portion together, and an inequality represented by $Y2-0.05 \times Y1 < Y2$ is satisfied, where $Y1$ represents a length of the spacer in a direction parallel to the central axis, $Y2$ represents an axial length of the first annular portion, and $J$ represents a radial dimension of an annular space formed between the outer ring member and the inner ring member.

6. A one-way clutch comprising:

a plurality of sprags located between an outer ring member and an inner ring member;

a cage that holds the sprags such that the sprags are circumferentially spaced from each other; and a spring disposed along the cage and in contact with the sprags, wherein the cage includes a tubular body and an annular flange, the body has a plurality of pockets that hold the sprags, the flange extends from an axial end of the body toward the outer ring member, and a clearance is formed between the outer ring member and the flange and along an entire circumference of the outer ring member and the flange, wherein the outer ring member includes a cylindrical portion in contact with a radially outer portion of each of the sprags, and an annular portion extending radially inward from a first axial end of the cylindrical portion, a spacer is provided between the cylindrical portion and the sprags, the spacer is configured to come into contact with a side surface of each of the sprags so as to limit tilting of the sprags with respect to an imaginary plane perpendicular to a central axis of the outer ring member, the spacer is integrated with the annular portion, and an inequality represented by $D2<D1 \leq D2+0.02 \times J$ is satisfied, where $D1$ represents a diameter of an inscribed circle of the spacer, $D2$ represents a diameter of an outer circumferential surface of the inner ring member, and $J$ represents a radial dimension of an annular space formed between the outer ring member and the inner ring member.

* * * * *